(12) United States Patent
Kanso et al.

(10) Patent No.: US 8,719,835 B2
(45) Date of Patent: May 6, 2014

(54) RANKING SERVICE UNITS TO PROVIDE AND PROTECT HIGHLY AVAILABLE SERVICES USING THE NWAY REDUNDANCY MODEL

(75) Inventors: Ali Kanso, Montreal (CA); Maria Toeroe, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 13 days.

(21) Appl. No.: 13/472,616

(22) Filed: May 16, 2012

(65) Prior Publication Data

US 2012/0317437 A1    Dec. 13, 2012

Related U.S. Application Data

(60) Provisional application No. 61/494,314, filed on Jun. 7, 2011.

(51) Int. Cl.
*G06F 9/46* (2006.01)
*G06F 11/16* (2006.01)
*G06F 15/173* (2006.01)

(52) U.S. Cl.
USPC ........... 718/105; 718/104; 714/4.11; 709/226

(58) Field of Classification Search
USPC .......................................................... 718/104
See application file for complete search history.

(56) References Cited

U.S. PATENT DOCUMENTS

| | | | | |
|---|---|---|---|---|
| 7,039,827 B2 * | 5/2006 | Meyer et al. | ................. | 714/4.11 |
| 2002/0007468 A1 * | 1/2002 | Kampe et al. | ..................... | 714/4 |
| 2002/0040402 A1 * | 4/2002 | Levy-Abegnoli et al. | .... | 709/229 |
| 2009/0164767 A1 | 6/2009 | Kanso et al. | | |
| 2010/0262860 A1 | 10/2010 | Sargor et al. | | |

OTHER PUBLICATIONS

Kanso, A., Toeroe, M., Hamou-Lhadj, A., & Khendek, F., Generating AMF Configurations from Software Vendor Constraints and User Requirements, Mar. 16-19, 2009, Availability, Reliability, and Security, 2009. ARES '09. pp. 454-461.*
Kanso, Ali. Automatic Generation of AMF Compliant Configurations. Aug. 2008, Concordia University. pp. 1-113.*
Ali Kanso, Maria Toeroe, Ferhat Khendek, and Abdelwahab Hamou-Lhadj; Automatic Generation of AMF Compliant Configurations; ISAS 2008, LNCS 5017, pp. 155-170, 2008.*
A. Kanso et al., "Ranking Service Units for Providing and Protecting Highly Available Services with Load Balancing", New Technologies of Distributed Systems (NOTERE), 2010 10th Annual International Conference in Tozeur, Tunisia, May 31-Jun. 2, 2010, pp. 33-40, IEEE, 8 pages.
Extended European Search Report in related European Application No. 12170811, dated Sep. 6, 2013, 8 pages.
Service Availability Forum Application Interface Specification, SA Forum Specifications Under the Artistic License 2.0, Availability Management Framework, SAI-AIS-AMF-B.04.01, Release 6.1 reissued on Sep. 30, 2011, 452 pages.

(Continued)

*Primary Examiner* — Abdullah Al Kawsar
(74) *Attorney, Agent, or Firm* — Patent Portfolio Builders PLLC

(57) ABSTRACT

Presented are methods and apparatus for protecting a plurality of High Availability (HA) Service Instances (SIs) with a plurality of Service Units (SUs) with an Nway redundancy model. Any of the SUs associated with the Nway redundancy model can simultaneously be assigned an active HA state for some of the SIs and a standby HA state for other SIs. However, only one SU can have the active state for any given SI. The Nway redundancy model is a configured prior to runtime operation.

16 Claims, 11 Drawing Sheets

(56) References Cited

OTHER PUBLICATIONS

Service Availability Forum Application Interface Specification, SA Forum Specifications Under the Artistic License 2.0, Platform Management Service, SAI-AIS-PLM-A.01.02, Release 6.1 reissued on Sep. 30, 2011, 186 pages.

Service Availability Forum Application Interface Specification, SA Forum Specifications Under the Artistic License 2.0, Software Management Framework, SAI-AIS-SMF-A.01.02, Release 6.1 reissued on Sep. 30, 2011, 174 pages.

* cited by examiner

| | SU1 | | SU2 | | SU3 | | SU4 | | SU5 | | BACKUP STANDBY | BACKUP ASSIGNMENT |
|---|---|---|---|---|---|---|---|---|---|---|---|---|
| | B.act | stdb | B.act | stdb | B.act | stdb | B.act | stdb | B.act | stdb | | |
| SU1 | ✕ | ✕ | 1(SU3) | 1 | 1(SU4) | 1 | 1(SU5) | 1 | 1(SU2) | 1 | 4 | 12 |
| SU2 | 1(SU4) | 1 | ✕ | ✕ | 1(SU5) | 1 | 1(SU3) | 1 | 1(SU1) | 1 | 4 | 12 |
| SU3 | 1(SU5) | 1 | 1(SU1) | 1 | ✕ | ✕ | 1(SU2) | 1 | 1(SU4) | 1 | 4 | 12 |
| SU4 | 1(SU2) | 1 | 1(SU5) | 1 | 1(SU1) | 1 | ✕ | ✕ | 1(SU3) | 1 | 4 | 12 |
| SU5 | 1(SU3) | 1 | | 2 | 1(SU2) | 1 | 1(SU1) | 1 | ✕ | ✕ | 3 | 9 |
| B.act | 4 | | 3 | | 4 | | 4 | | 4 | | | Σ = 57 |
| stdb | 3 | | 5 | | 3 | | 3 | | 4 | | | |

| | SU1 | SU2 | SU3 | SU4 | SU5 |
|---|---|---|---|---|---|
| Si1 | 4 | 1 | | 3 | 2 |
| Si2 | 4 | 2 | 1 | | 3 |
| Si3 | 4 | 3 | 2 | 1 | |
| Si4 | 4 | | 3 | 2 | 1 |
| Si5 | 1 | 4 | 3 | | 2 |
| Si6 | 3 | 4 | 1 | 2 | |
| Si7 | 2 | 4 | | 1 | 3 |
| Si8 | | 4 | 2 | 3 | 1 |
| Si9 | 1 | 2 | 4 | | 3 |
| Si10 | 3 | 1 | 4 | 2 | |
| Si11 | | 3 | 4 | 1 | 2 |
| Si12 | 2 | | 4 | 3 | 1 |
| Si13 | 1 | 3 | 2 | 4 | |
| Si14 | 2 | 1 | | 4 | 3 |
| Si15 | 3 | | 1 | 4 | 2 |
| Si16 | | 2 | 3 | 4 | 1 |
| Si17 | 1 | 3 | | 2 | 4 |
| Si18 | | 1 | 2 | 3 | 4 |
| Si19 | 2 | 3 | 1 | | 4 |

FIG. 9

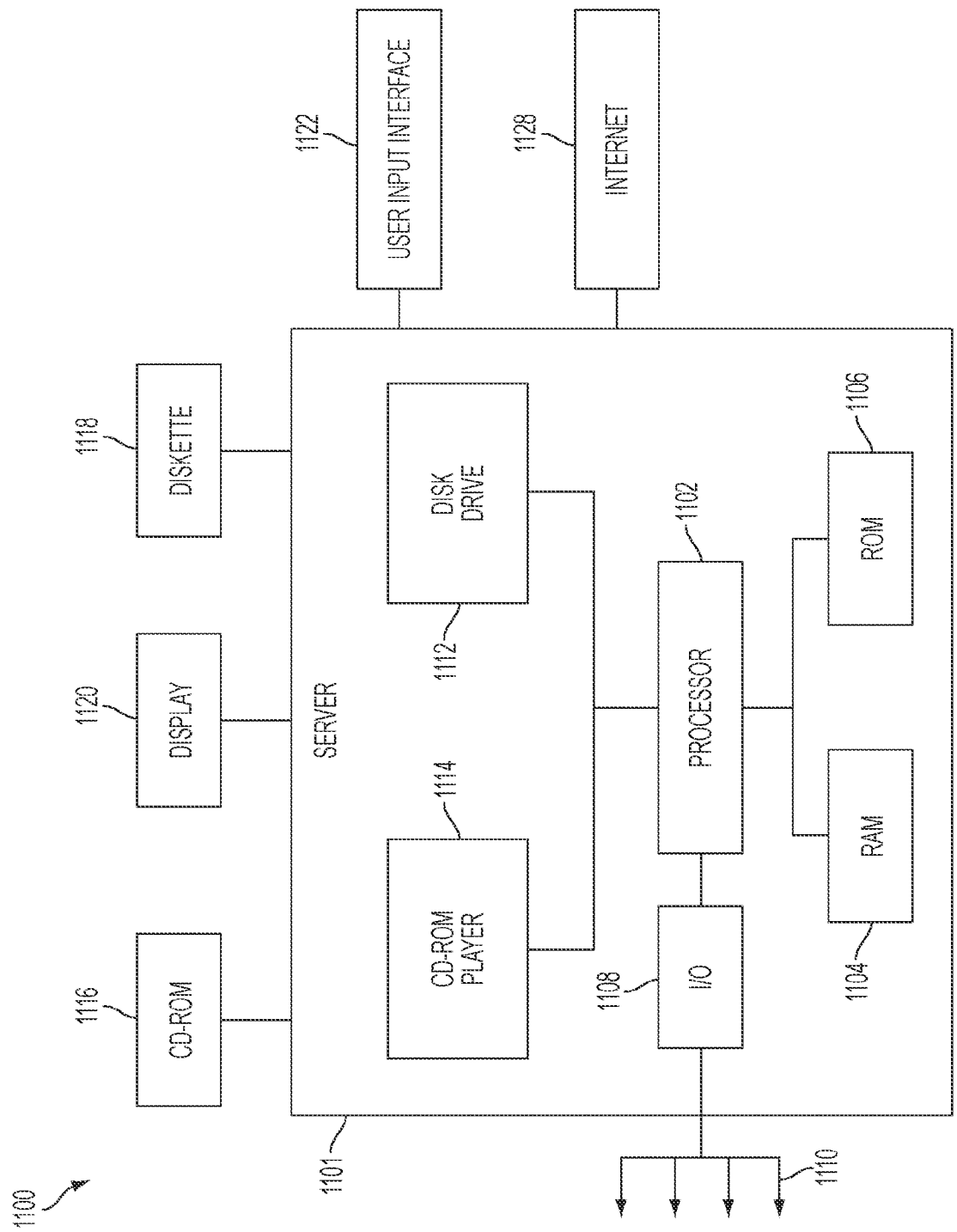

RANKING SERVICE UNITS TO PROVIDE AND PROTECT HIGHLY AVAILABLE SERVICES USING THE NWAY REDUNDANCY MODEL

RELATED APPLICATION

The present application is related to, and claims priority from, U.S. Provisional Patent Application No. 61/494,314, filed Jun. 7, 2011, entitled "Ranking Service Units to Provide and Protect Highly Available Services Using the Nway Redundancy Model", to Ali Kanso and Maria Toeroe, the disclosure of which is incorporated herein by reference.

The present application is related to U.S. patent application Ser. No. 13/020,550, filed Feb. 3, 2011, entitled "Load and Backup Assignment Balancing in High Availability Systems", to Ali Kanso and Maria Toeroe, the disclosure of which is incorporated herein by reference and U.S. patent application Ser. No. 13/051,824, filed Mar. 18, 2011, entitled "Ranking Service Units to Provide and Protect Highly Available Services Using N+M Redundancy Models", to Ali Kanso and Maria Toeroe, the disclosure of which is incorporated herein by reference.

TECHNICAL FIELD

The present invention generally relates to high availability systems (hardware and software) and, more particularly, to managing workload assignments and backup assignments associated with such high availability (or other) systems.

BACKGROUND

High availability systems (also known as HA systems) are systems that are implemented primarily for the purpose of improving the availability of services which the systems provide. Availability can be expressed as a percentage of time during which a system or service is "up." For example, a system designed for 99.999% availability (so called "five nines" availability) refers to a system or service which has a downtime of only about 0.44 minutes/month or 5.26 minutes/year. The Service Availability Forum has standardized the Application Interface Specifications (AIS) to facilitate the development of commercial off the shelf components for highly availability. The reader interested in more information relating to the AIS standard specification is referred to Release 6.1, which is available at www.saforum.org, the disclosure of which is incorporated here by reference.

High availability systems provide for a designed level of availability by employing redundant components and nodes, which are used to provide service when system components fail. For example, if a server running a particular application crashes, an HA system will detect the crash and restart the application on another, redundant node. Various redundancy models can be used in HA systems. As HA systems become more commonplace for the support of important services such as file sharing, internet customer portals, databases and the like, it has become desirable to provide standardized models and methodologies for the design of such systems.

Of particular interest for the present application is the Availability Management Framework (AMF), which is a software entity or service defined within the AIS specification. According to the AIS specification, the AMF is a standardized mechanism for providing service availability by coordinating redundant resources within a cluster to deliver a system with no single point of failure. The AMF service requires a configuration for any application it manages. An AMF configuration can be seen as an organization of some logical entities. It also comprises information that can guide AMF in assigning the workload to the application components. AMF managed applications are typically deployed as distributed system over a cluster of nodes, and load balancing is therefore an important aspect to be considered when designing the configuration.

In terms of the AMF entities, in an AMF configuration a component represents a set of hardware and/or software resources that implements the APIs that allow AMF to control its life cycle and its workload assignment. The components that combine their functionalities to provide a more integrated service are logically grouped into a service unit (SU). For control purposes, the workload assigned to a component is abstracted as a component service instance (CSI). CSIs are grouped into a service instance (SI), which represent an abstraction of workload assigned to the SU. In order to ensure the provision of the SI in case of an SU failure, SUs are grouped into a service group (SG). An SU can be assigned the active HA (High Availability) state for an SI, the standby HA state, or it can be a spare one. The service represented by the SI is provided by the SU(s) assigned the HA active state. The SIs provisioning is protected by the SG according to a redundancy model. AMF will dynamically shift the assignment of the SI from a failed SU to another SU in the same SG. The SGs are grouped into applications. There are two additional AMF logical entities used for deployment purpose: the cluster and the node. The cluster consists of a collection of nodes on which applications are deployed under the control of AMF.

An example of an AMF configuration 100 is shown in FIG. 1 where the components C1 and C2 are grouped into SU1, which collaborates with other similar SUs of the SG 104, i.e., SU2 and SU3, to protect the provision of the SIs. An AMF application 102 is a grouping of SGs and the SIs that they protect. In this example each SI has one active assignment (represented by a solid arrow) and one standby assignment (represent by a dashed arrow).

As mentioned above, the assignment of SIs to SUs is performed at runtime based on the configured ranking of the SUs for each of the SIs. Using conventional algorithms to determine the ranked list, like round robin, the shifting of SIs from a failed SU to healthy SUs can lead to an unbalanced workload among the SUs, which can lead to overload causing subsequent failures and performance degradation.

Accordingly, it would be desirable to provide methods, devices, systems and software for configuring the SU ranks in, for example, high availability systems.

SUMMARY

According to an exemplary embodiment, a method, stored in a memory and executing on a processor, for configuring a system providing High Availability of a Service, comprises assigning roles to a plurality of Service Units (SUs) associated with a plurality of Service Instances (SIs) in a system configured to use an Nway redundancy model, wherein the assigning is performed in a manner which enables a balanced distribution of SI load during runtime of the configured system both before and after a failure of one of the plurality of SUs and configuring the plurality of SUs for redundant operation based on the assigned roles.

According to another exemplary embodiment, a computer system for providing configuration for High Availability (HA) of a Service includes a processor adapted to assign roles to a plurality of Service Units (SUs) associated with a plurality of Service Instances (SIs) in a system configured to use an Nway redundancy model, wherein the assigning is performed in a manner which enables a balanced distribution of SI load during runtime of the system both before and after a failure of one of the plurality of SUs, wherein the processor is further adapted to configure said plurality of SUs for redundant operation based on said assigned roles.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 is a schematic diagram of an exemplary embodiment depicting an assignment table for an Nway redundancy model for a five service unit example;

FIG. 9 is a schematic diagram of an exemplary embodiment depicting a ranked list of Service Units generated from an assignment table for an Nway redundancy model;

FIG. 11 is a schematic diagram of a computing device suitable for configuration.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of path performance determination and associated nodes in communication systems. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
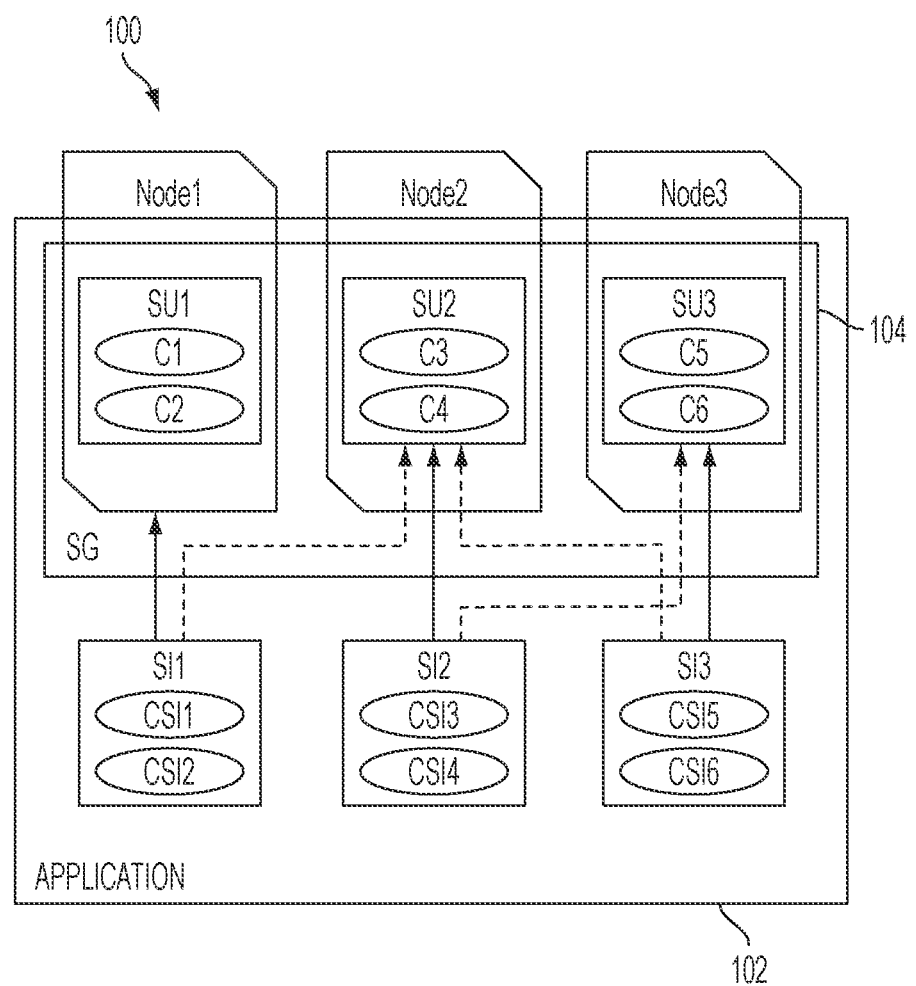
FIG. 1 is a schematic diagram of a prior art Availability Management Framework (AMF) configuration.
Figure 2:
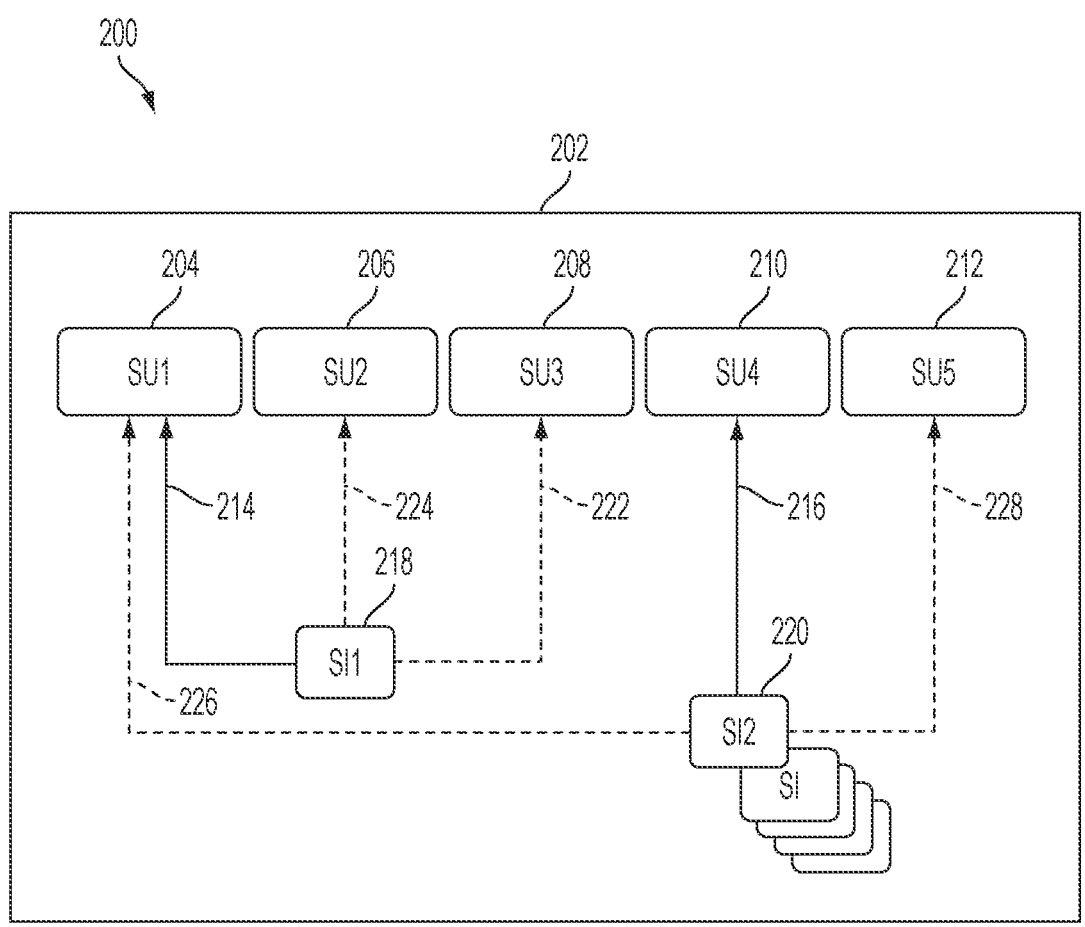
FIG. 2 is a schematic diagram of an exemplary embodiment Service Group (SG) depicting an Nway redundancy model.

To provide some further context for the subsequent discussion of the embodiments, a Service Group (SG) using the Nway redundancy model contains a plurality of Service Units (SUs) that protect a plurality of Service Instances (SIs). In the Nway redundancy model, an SU can simultaneously be assigned the active High Availability (HA) state for some SIs and the standby HA state for other SIs. One restriction imposed by Nway redundancy model is that, at most, one SU can have the active HA state for an SI, but one, or multiple SUs may have the standby HA state for one SI. Handling the load in the Nway model requires that each SU is allowed to be active and standby simultaneously, in other words there are no dedicated active SUs or dedicated standby SUs. When an SU fails in a system using an Nway redundancy model, both its active load and standby load must be re-distributed among the other SUs. FIG. 2 shows an example 200 of an SG 202 of 5 SUs 204, 206, 208, 210, 212 using the Nway redundancy model, wherein the number of active assignments 214, 216 for each of a plurality of SIs 218, 220 is equal to one and the number of standby assignments 222, 224, 226, 228 is equal to two (numberOfStdbAssignments=2). That is, each SI 218, 220 will have one active SU 214, 216 and two standby SUs 222, 224, 226, 228, respectively.

The exemplary embodiments, to be described below, describe techniques and systems for assigning (or determining) roles, e.g., active, backup active, backup standby, etc. to the SUs relative to the SIs as part of the configuration process of a system employing Nway redundancy. The assignment or determination of roles according to these embodiments is performed in a manner which subsequently results in load balancing during runtime of the configured system, both before and after failure of an SU. Next, the roles which can be assigned during the configuration process will be identified.

At configuration time, one of the SUs will be assigned the active role for each SI, e.g., using various ranking techniques to be described below. Provided it is healthy, the SU having the active role will receive the active HA assignment at runtime. Although, as previously described, one or more standby SUs can be configured for each SI, it should be noted that only one of the SUs preconfigured for the standby role will take over the active assignment in the circumstance where the active SU for this particular SI fails. This standby SU is referred to herein as having the role of the backup active SU. When the active SU for a particular SI fails during runtime, the SU given the backup active role for that SI during configuration becomes the active SU for this SI and loses one of its original standby assignments. Further, another SU, referred to herein as having the backup standby role for this SI, takes over this standby assignment.

Figure 3:
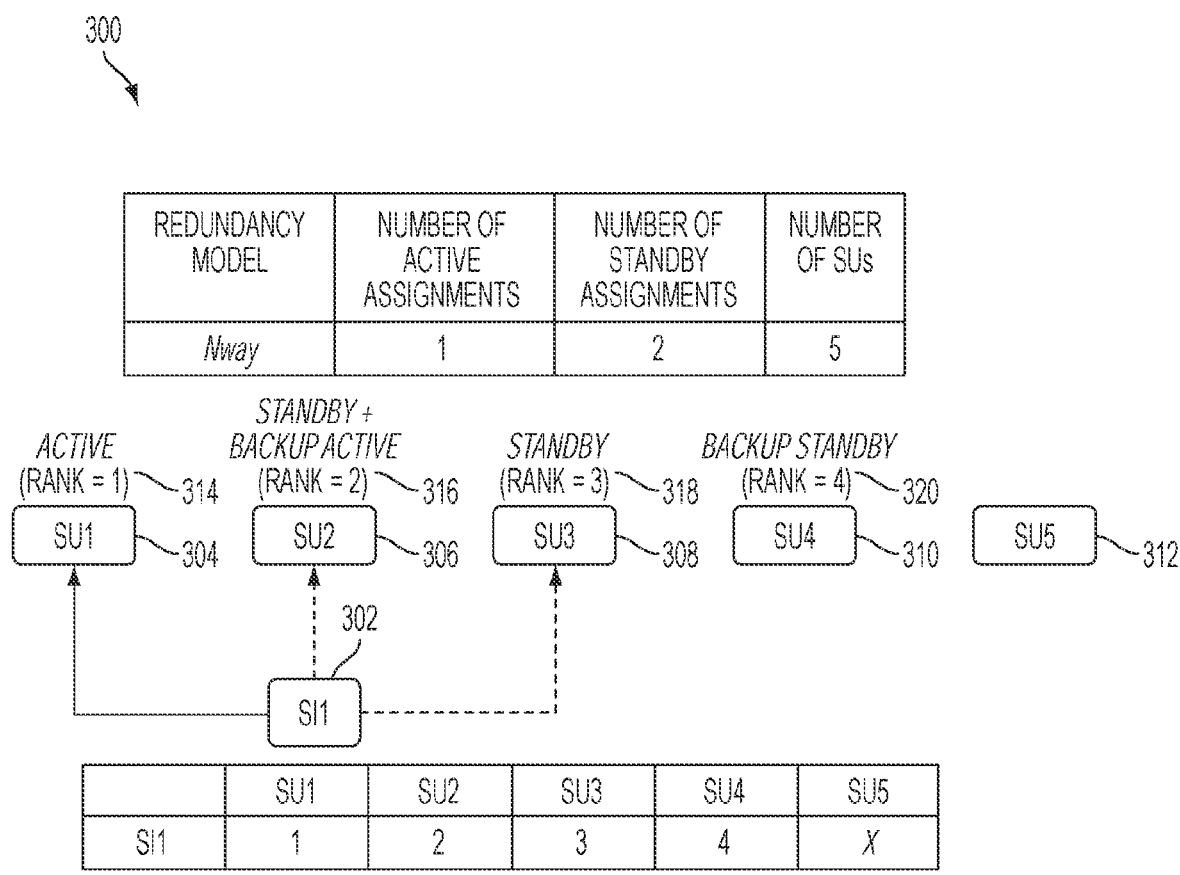
FIG. 3 is a schematic diagram of an exemplary embodiment Service Group (SG) depicting ranking assignments of an Nway redundancy model.

Ranking techniques can be used according to these embodiments to establish each SU's roles at configuration time for a particular system. For example, looking now to FIG. 3, an exemplary embodiment depicts the ranking for a plurality of SUs 304, 306, 308, 310 backing up an SI 302. Continuing with the exemplary embodiment, in terms of ranking, the Active role 314 assignment for the SI 302 is given to SU 304, which has the highest rank=1 (lowest integer value). The backup active 316 SU 306 has the next highest rank after the active SU 304. It is also the highest ranking standby. The backup standby 320 SU 310 has the next highest rank after the lowest ranking standby 318 SU 308 on behalf of a particular SI 302. In other words, since the number of standby role assignments is equal to two (numberOfStdbAssignments=2), then the two next highest ranks 316, 318 after the active rank 314 are the standbys. Note that in case we had more standbys we could have assigned the rank of 3 to all of them, except for the standby+backup active 316 (we will simply refer to it as the backup active). It should be noted in the exemplary embodiment that the SU 304, 306, 308, 310, 312 ranks 314, 316, 318, 320 are configured for each SI 302 such that when the ranks 314, 316, 318, 320 are used to assign the workload represented by the SIs 302, the total workload (all the assignments of all the SIs 302 protected by the SG) is distributed evenly among the SUs 304, 306, 308, 310, 312 and it remains so even after an SU 304, 306, 308, 310, 312 fails.

Continuing with the exemplary embodiment, there are certain assumptions that we make in the Nway model solution. First, the exemplary embodiment assumes the number of standby role assignments for any SI is greater than or equal to 1 (numberOfStdbAssignments≥1). Otherwise, the exemplary embodiment becomes a special case of Nway active, where the number of active assignments=1. Thus initially, when all the SUs are healthy and functioning, have a backup standby SU for each SI, or in other words the number of SUs is greater than or equal to the quantity of the number of standby role assignments plus 2.

Solving the exemplary embodiment load balancing issue for Nway redundancy can be summarised by performing these steps during configuration: 1) Balance the active role assignments among SUs; 2) Balance the standby role assignments among SUs; 3) Balance the backup standby role assignments among SUs; 4) Balance the backup active role assignments among SUs; 5) Let the backup active role assignment of each SU be equally backed up by the other SUs; and 6) Let the backup role assignments of each SU be filled with equal contributions from the other SUs. It should be noted in the exemplary embodiment that before balancing, we calculate the values that reflect the balanced loads. It should also be noted in the exemplary embodiment that the active load that each SU is expected to handle in order to have a balanced load is shown in equation 1 and the standby load is shown in equation 2. It should further be noted in the exemplary embodiment that the active equation 1 is also used to calculate the backup active load and backup standby load because each SI can have at most one active, one backup active and one backup standby SU.

Active Load in *Nway* Redundancy $$\text{Backup\_Active} = \text{Backup\_Stdb} = \begin{cases} \left\lfloor \dfrac{numberOfSI\ s}{numberOfSU\ s} \right\rfloor \\ \text{or} \\ \left\lceil \dfrac{numberOfSI\ s}{numberOfSU\ s} \right\rceil \end{cases} \quad \text{Equation 1}$$

Standby load in *Nway* redundancy.

$$Stdb = \begin{cases} \left\lfloor \dfrac{numberOfSI\ s \times numberOfSt\ dbAssignments}{numberOfSU\ s} \right\rfloor \\ \text{or} \\ \left\lceil \dfrac{numberOfSI\ s \times numberOfSt\ dbAssignments}{numberOfSU\ s} \right\rceil \end{cases} \quad \text{Equation 2}$$

-continued

Backup assignments of an *SU*:

$$\text{Backup\_Assignment} = \begin{cases} \left\lfloor \dfrac{numberOfSI\ s}{numberOfSU\ s} \right\rfloor \times (numberOfSt\ dbAssignments + 1) \\ \text{or} \\ \left\lceil \dfrac{numberOfSI\ s}{numberOfSU\ s} \right\rceil \times (numberOfSt\ dbAssignments + 1) \end{cases} \quad \text{Equation 3}$$

Continuing with the exemplary embodiment, Equation 3 is used to calculate the backup role assignments of an SU, which in case of the Nway redundancy model includes both the active role assignments and the standby role assignments. To illustrate this aspect of the exemplary embodiment, return to the example shown in FIG. 3, where SU4 310 is the backup standby SU for all the HA state assignments of SI1 302. Based on the rankings shown in the exemplary embodiment, it is presented that if SU2 306 or SU3 308 fail, it is SU4 310 which becomes the standby SU, and takes over the standby assignment on behalf of SI1 302. It should further be noted in the exemplary embodiment, even if SU1 304 fails (i.e., the SU which was configured for the active role while having the active HA state assignment), then the SU having the backup standby role, i.e., SU4 310 in this example, will still receive a standby assignment, due to the fact that when SU1 304 fails, SU2 306 will become active for SI1 302 and as a result SI1 302 will lose a standby assignment unless SU4 310 takes over this assignment. Accordingly, it should be noted in the exemplary embodiment that SU4 310 is a backup not only for the standby assignments, but indirectly, it is also backing up the active assignment as well. Returning to exemplary embodiment equation 3, the '+1' added to the equation is to capture the active assignment, as previously described, that the backup standby is also backing up and therefore could also be expressed as Backup_Assignment=Backup_Stdb×(numberOfStdbAssignmnents+1).

Figure 4:
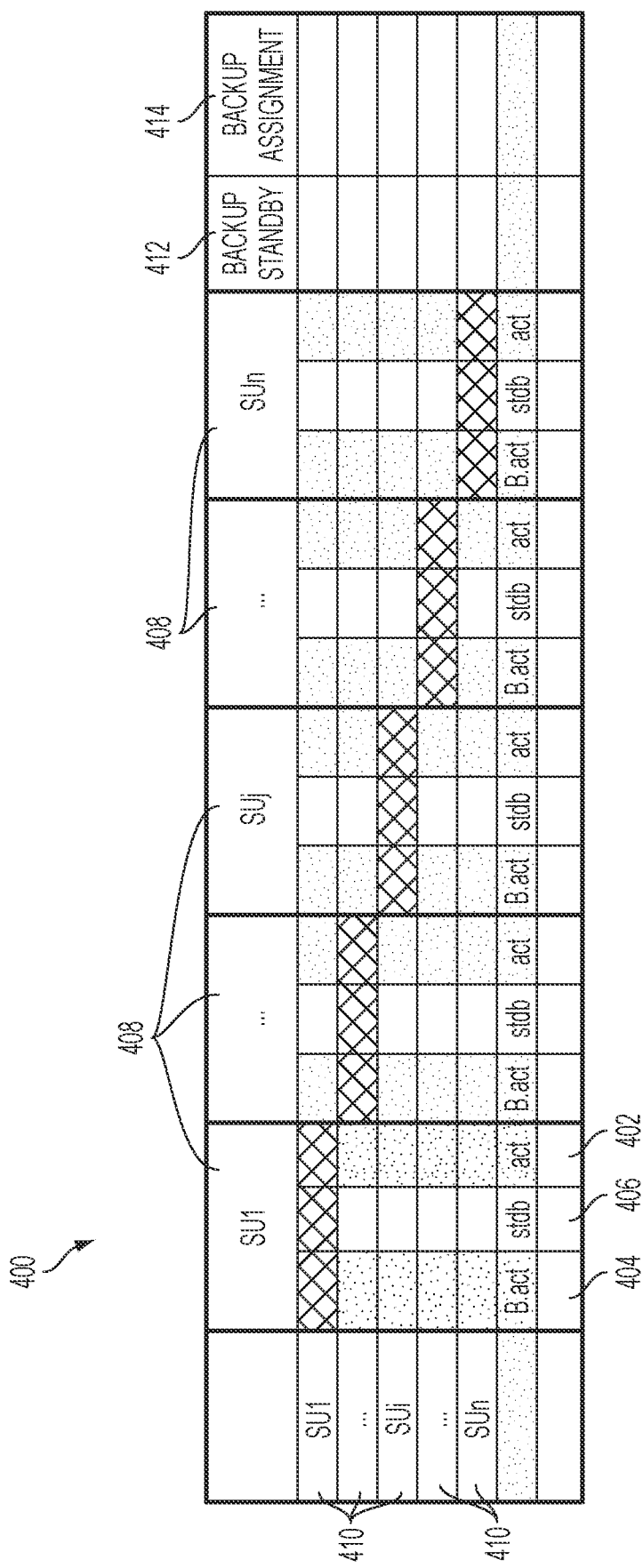
FIG. 4 is a schematic diagram of an exemplary embodiment depicting an assignment table for an Nway redundancy model.

Looking now to FIG. 4, an exemplary embodiment of an assignment table 400 is depicted. In one aspect of the exemplary embodiment, the assignment table presents a summary view of all the role assignments previously discussed. Continuing with the exemplary embodiment, each SU column 408 of the table is further divided into three columns to capture 1) the number of active role assignments 402; 2) the number of backup active role assignments 404; and 3) the number of standby role assignments 406 that each SU needs to handle. Next in the exemplary embodiment, the rows 410 of the assignment table are used to represent the backup role assignments for each SU. Further in the exemplary embodiment, the role assignment table comprises a column 412 for summing the backup standby role assignments and a column 414 for summing the backup role assignments. To better explain the use of the role assignment table and the approach for load balancing using an Nway model, we present a case study based on the example shown in FIG. 2.

Looking now to FIG. 5, an example assignment table 500 is presented of a SG with Nway redundancy wherein five SUs are protecting nineteen SIs. Each SI of the exemplary embodiment will need to have 1 active HA state assignments and 2 standby HA state assignments, and accordingly for the ranking calculation it needs to have 1 active role assignment and 2 standby role assignments as described in the case presented in FIG. 3. Next in the exemplary embodiment and according to equation 1, each SU is active for three or four SIs, is backup active for three or four SIs and is backup standby for three or four SIs. Note in the exemplary embodiment that if an SU has the active role for four SIs, it does not mean that it should also have the backup active or backup standby roles for four SIs as well, those numbers are not related. On the other hand in the exemplary embodiment, if an SU is backup standby for four SIs, this means, according to equation 3, that this SU is backup standby for 4×(2+1)=12 assignments. That is to say, the number of backup standby role assignments and the backup role assignments of the exemplary embodiment are related. The standby load that each SU of the exemplary embodiment must handle is given by equation 2 to be equal to seven or eight SIs. FIG. 5 shows an exemplary embodiment balanced role assignment table wherein the rationale behind the values in this table is now explained.

Figure 6:
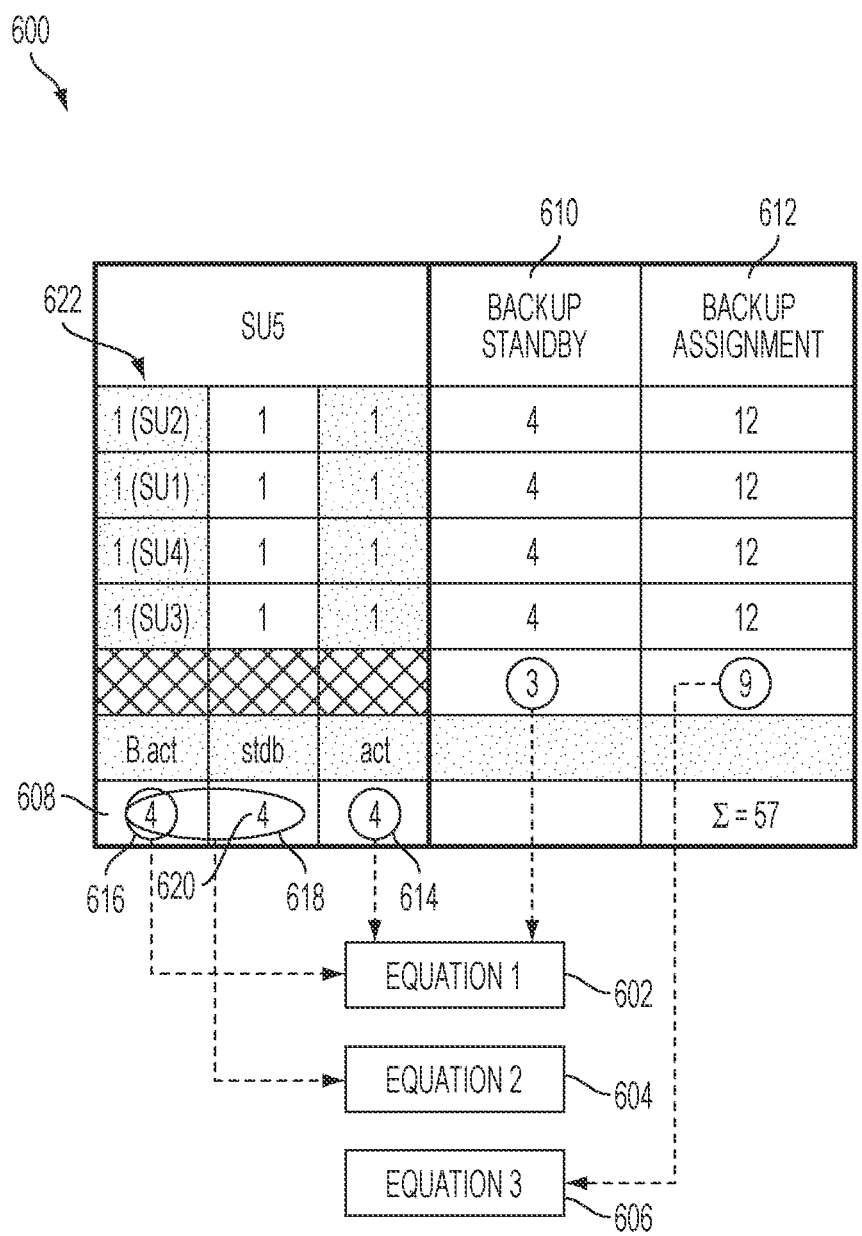
FIG. 6 is a schematic diagram of an exemplary embodiment depicting a portion of an assignment table for an Nway redundancy model and illustrating relationships between source equations and values in an Nway assignment table.

Looking now to FIG. 6, an exemplary embodiment of a portion of the role assignment table of FIG. 5 depicts the source equations 602, 604, 606 of the values in the bottom row 608 and the two right most columns 610, 612 of the role assignment table. The rest of the values in the exemplary embodiment role assignment table are calculated in such a way that the values impose equal contribution from the different SUs and their sum will satisfy the values calculated by the equations 602, 604, 606 defined for use with the Nway model (equations 1, 2 and 3). For example, the load calculated for SU5 is as presented in row 608 4 active role assignments 614, 4 backup active role assignments 616, and 8 (4+4) standby role assignments 618. It should be noted in the exemplary embodiment that the standby role load assignments 618 (calculated by equation 604) is split between the backup active role load assignments 616 (calculated by equation 602) and standby role load assignments 620. The values of column 610 and 612 are calculated by equation 602 and 606 respectively so that the sum 624 of column 612 in row 608 is equal to numberOfSIs×(numberOfStdbAssignmnents+1). It should further be noted in the exemplary embodiment that in the backup active column 622 of SU5 we can see in each cell the SU for which SU5 is backup active. For example, the value of "1(SU2)" in the backup active column of SU5 signifies that for a particular SI assigned active for SU2, SU5 is the backup active role assignment, while SU1 is the backup standby role assignment for the same SI since we are in the SU1 row.

Figure 7:
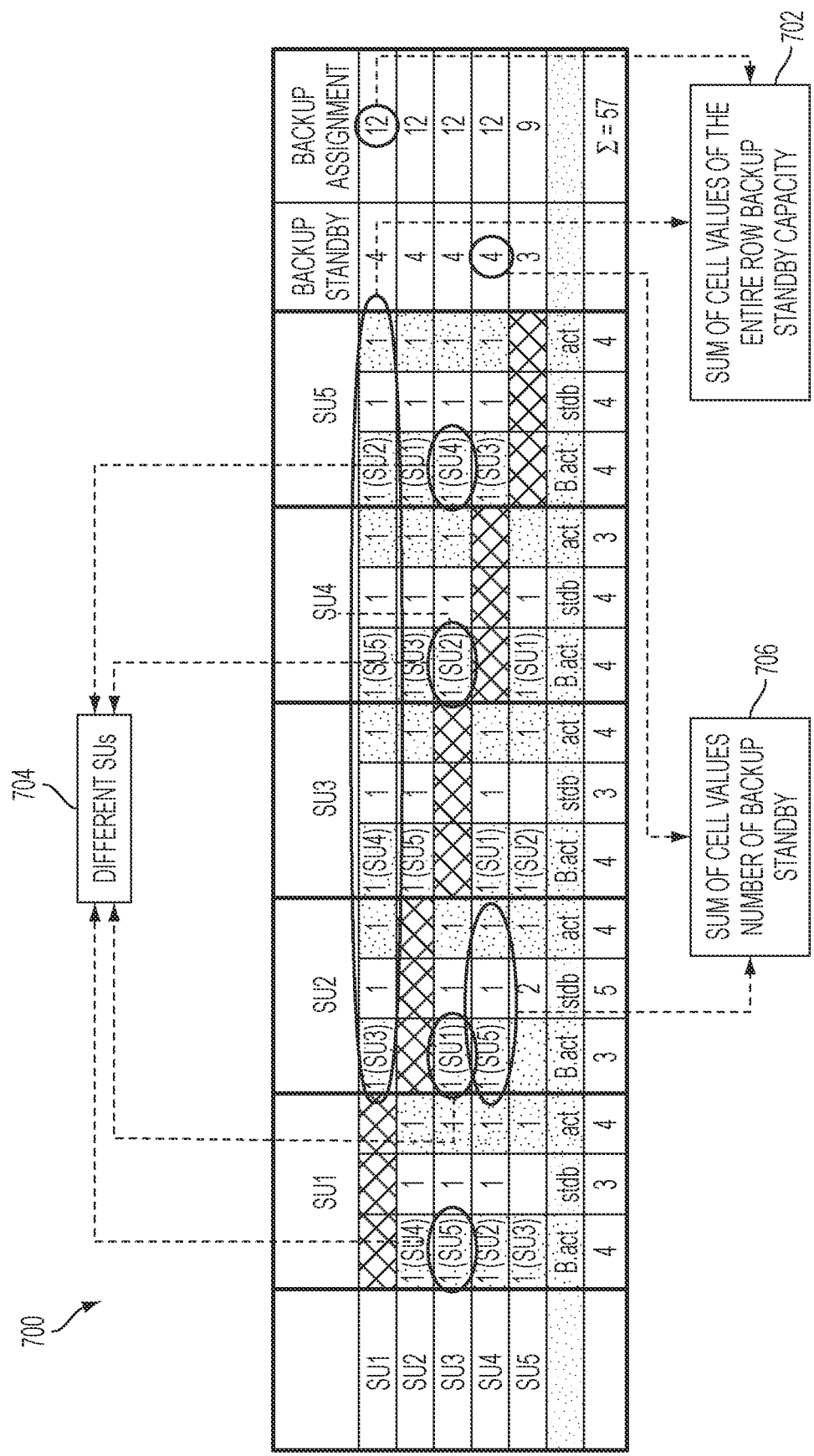
FIG. 7 is a schematic diagram of an exemplary embodiment depicting an assignment table for an Nway redundancy model and illustrating additional constraints in balancing an Nway assignment table.

Looking now to FIG. 7 and another aspect of the exemplary embodiment, there are additional constraints 700 to be satisfied in balancing the role assignment table besides having the sum of columns satisfy the outcomes of equations 1 and 2. The additional constraints 700 of the exemplary embodiment are depicted in FIG. 7 and described as 1) The sum of the cell values of the entire row for each SU is equal to the backup role assignments specified for this row 702 while also the values impose equal contribution from the different SUs; 2) The active SUs (specified between parentheses in the backup active column cell) of each row are unique for that row 704; and 3) The sum of values of the sub-cells of a (SU$_i$, SU$_j$) cell is less than or equal to the number of the backup standby role assignments in the SU$_i$ row 706.

Figure 8:
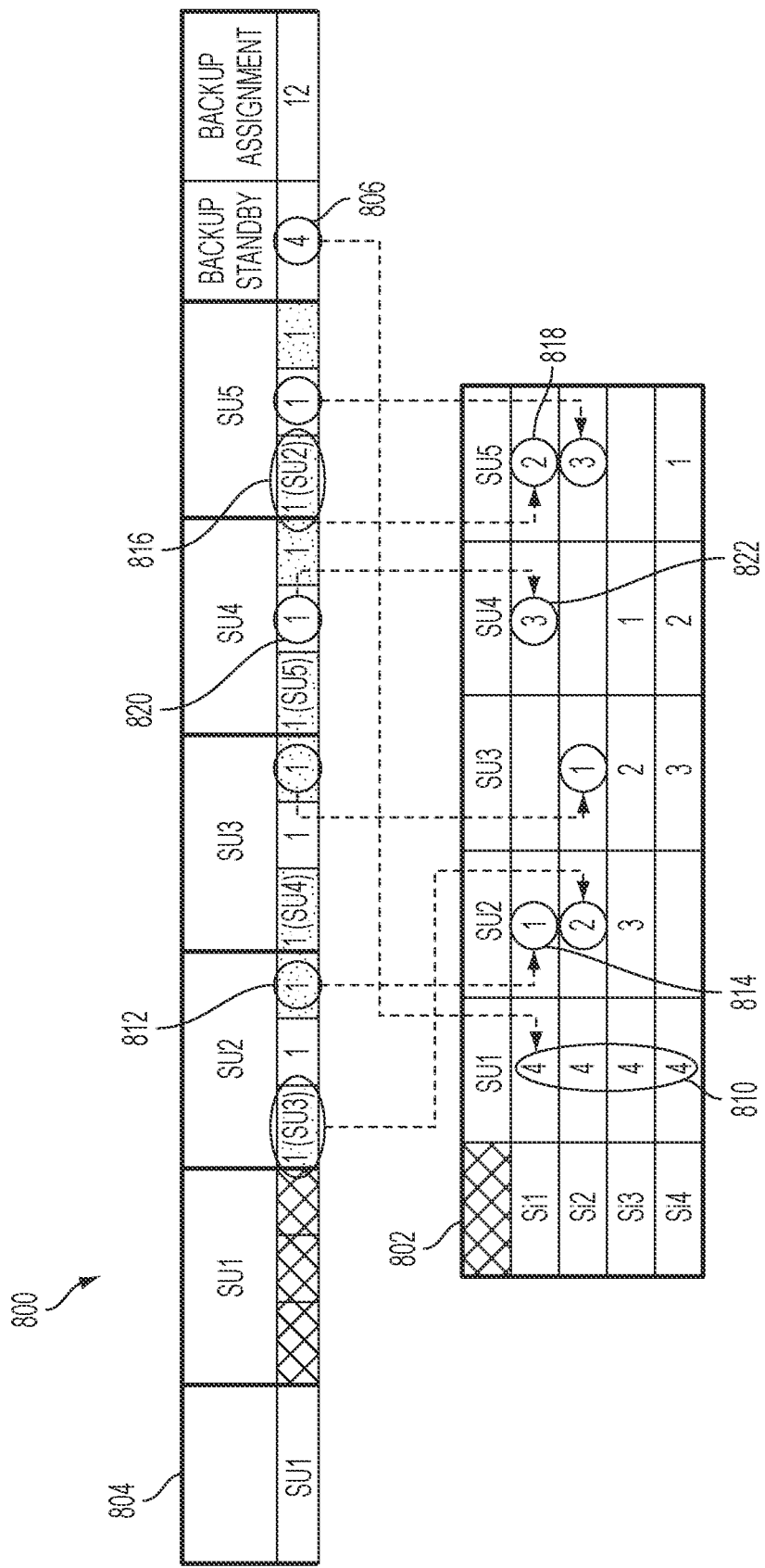
FIG. 8 is a schematic diagram of an exemplary embodiment depicting a portion of an assignment table for an Nway redundancy model and illustrating deriving a ranked list of Service Units from the Nway assignment table.

Looking now to FIG. 8, an exemplary embodiment 800 depicts the derivation of the SU rank list of the SIs 802 from one row of the SU role assignment table 804. In one aspect of the exemplary embodiment, SU1 requires four backup standby role assignments 806 (i.e. it is the backup standby for four different SIs). In another aspect of the exemplary embodiment, a ranking 802 for SI1, SI2, SI3 and SI4 is created wherein each SI ranks SU1 as a backup standby 810 by ranking it at a value of 4. Further in the exemplary embodiment, wherein SU2 requires an active role assignment 812 among those SIs for which SU1 has the backup standby role, SU2 is selected for the highest rank for SI1 814 by giving SU2 the rank of 1. Next in the exemplary embodiment, wherein SU5 must be the backup active for the active assignment of SU2 816, SI1 must rank SU5 as such, resulting in rank 2 for SU5 818. One of the still unranked for SI1 SUs which can be a standby, SU4 820 was selected, is assigned role rank 3 822. Continuing with the exemplary embodiment, deriving the SU rank list of the SIs 802 is based on using a row 804 of the role assignment table 700 as a map, and accordingly, incrementally building the SU rank list of the SIs 802, from a row 804 of the role assignment table 700.

FIG. 9 shows an example of a complete SU ranked list 900 of the SIs, which can be generated using the afore-described techniques according to these embodiments, i.e., the roles assigned to the various SUs during configuration of an exemplary system. The completed ranked list 900 depicts, through the occurrence of rank 1 in the table 900, the active role assignments of the SIs 902 equally distributed among the protecting SUs 904 and similarly, standby role assignments (ranks 2 and 3) of the SIs 902 equally distributed among the protecting SUs 904. It should be noted that the creation of the ranked list of SUs 900 using an Nway model is performed at configuration time of the system according to this exemplary embodiment, not at runtime.

An example of HA protection which is performed at runtime, using the ranked list 900 which was generated at configuration time using the afore-described techniques according to the embodiments described above, can be shown by presuming a failure of SU1 based on the ranked list 900 of SUs presented in FIG. 9. First in the HA protection example, each SI that is active (ranking SU1 at 1) on failed SU1 becomes active on the SU designated as backup active role (rank of 2) for the associated SI, i.e., SU5 becomes active for SI5, SU2 becomes active for SI9, SU3 becomes active for SI13 and SU4 becomes active for SI17. Next in the HA protection example, each SI assignment associated with failed SU1 based on a backup active role rank (rank 2) is shifted to the SU identified as a backup standby role (rank 4) for the SI, i.e., SU2 becomes standby for SI7, SU3 becomes standby for SI12, SU4 becomes standby for SI14 and SU5 becomes standby for SI19. Next in the HA protection example, each SI associated with failed SU1 based on a standby rank (rank 3) is shifted also to the SU identified as a backup standby role (rank 4) for the SI, i.e., SU2 becomes standby for SI6, SU3 becomes standby for SI10 and SU4 becomes standby for SI15.

Figure 10:
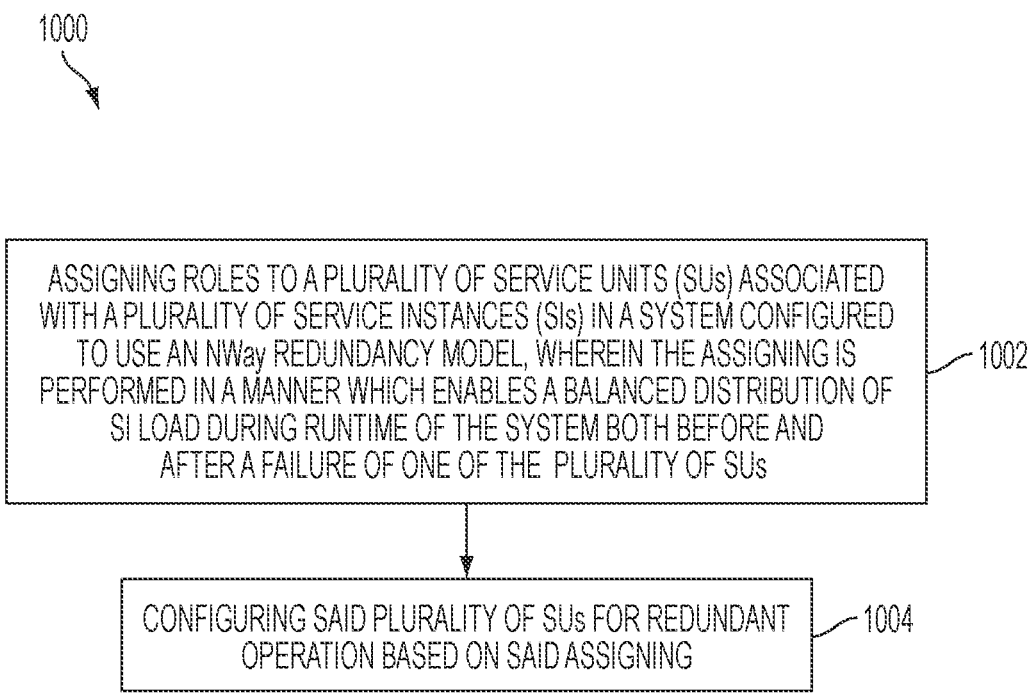
FIG. 10 is a flowchart diagram of a method for protecting a plurality of High Availability Service Instances with a plurality of Service Units.

Looking now to FIG. 10, a flowchart 1000 for an exemplary method embodiment is depicted. Beginning at step 1002, the exemplary method embodiment assigns a plurality of SUs associated with a plurality of SIs in a system configured to use an Nway redundancy model. Next, at step 1004, the exemplary method embodiment configures the plurality of SUs for redundant operation based on the assignments. In one aspect of the exemplary method embodiment, the Nway redundancy models allows an SU to simultaneously be assigned an active HA state for some SIs and a standby HA state for other SUs, i.e. dedicated active SUs or dedicated standby SUs are not required.

Continuing with the exemplary method embodiment, the assignments described above for step 1002 can further comprise calculating an active role load, a backup active role load and a backup standby role load for the plurality of SUs wherein said calculating is constrained such that a sum of said active role load, the backup active role load and the standby role load for any one of said plurality of SUs is less than or equal to a backup standby role load of the corresponding SU.

In another aspect of the exemplary method embodiment, the assignments can further comprise calculating a standby role load for each of the plurality of SUs and calculating a backup assignment role load for each of the plurality of SUs wherein a backup role assignment load is a constraint such that a sum of said active role load assignments, the backup active role load assignments and the backup standby role load assignments for all SUs for which each of the plurality of SUs is assigned is equal to the backup assignment role load.

Next in the exemplary method embodiment, the configuring described above for step 1004 can further comprise assigning one or more active roles, associated with one or more of the plurality of SIs, to each of said plurality of SUs. In another aspect of the exemplary method embodiment, the configuring can also further comprise assigning one or more additional roles, associated with one or more of the plurality of SIs, to each of the plurality of SUs wherein each of the remainder of SUs associated with the one or more backup active role assignments cannot be duplicated and assigning one or more standby roles, associated with one or more of said plurality of SIs, to each of the plurality of SUs.

A ranking configuration system involved in the protection of SIs in connection with the above described embodiments may be any type of computing device capable of active or backup support for SIs. An example of a representative computing system capable of carrying out operations in accordance with the servers of the exemplary embodiments is illustrated in FIG. 11. Hardware, firmware, software or a combination thereof may be used to perform the various steps and operations described herein. The computing structure 1100 of FIG. 11 is an exemplary computing structure that may be used in connection with such a system.

The exemplary computing arrangement 1100 suitable for performing the activities described in the exemplary embodiments may include a computing node. Such a node 1101 may include a central processor (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. The processor 1102 carries out a variety of functions as is known in the art, as dictated by software and/or firmware instructions.

The node 1101 may also include one or more data storage devices, including hard and floppy disk drives 1112, CD-ROM drives 1114, and other hardware capable of reading and/or storing information such as DVD, etc. In one embodiment, software for carrying out the above discussed steps may be stored and distributed on a CD-ROM 1116, diskette 1118 or other form of media capable of portably storing information. These storage media may be inserted into, and read by, devices such as the CD-ROM drive 1114, the disk drive 1112, etc. The node 1101 may be coupled to a display 1120, which may be any type of known display or presentation screen, such as LCD displays, plasma display, cathode ray tubes (CRT), etc. A user input interface 1122 is provided, including one or more user interface mechanisms such as a mouse, keyboard, microphone, touch pad, touch screen, voice-recognition system, etc.

The node 1101 may be coupled to other computing devices, such as the landline and/or wireless terminals and associated watcher applications, via a network. The server may be part of a larger network configuration as in a global area network (GAN) such as the Internet 1128, which allows ultimate connection to the various landline and/or mobile client/watcher devices. The computer system of FIG. 11 provides an example of a system which can be used, e.g., to perform the configuration process illustrated in the flow chart of FIG. 10.

In various embodiments, techniques are described which enable balancing of the loading before and/or after a runtime failure of an SU. In this context the terms "balancing", "equally balanced" or the like refer to a substantial balancing of the load across SUs, i.e., to within +/−1 SI assignment, since (in certain cases) it will not be possible to achieve perfectly equal load balancing across a set of functioning SUs.

The disclosed exemplary embodiments provide a user terminal, a system, a method and a computer program product for obtaining, storing (caching) and supplying high availability protection management associated with distributed service instances. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

The invention claimed is:

1. A method, stored in a memory and executing on a processor, for providing configuration for High Availability (HA) of a Service, said method comprising:
    assigning roles to a plurality of Service Units (SUs) associated with a plurality of Service Instances (SIs) in a system configured to use an Nway redundancy model, wherein said Nway redundancy model is defined such that an SU can simultaneously be assigned an active role for one or more of said plurality of SIs, a standby role for one or more of said plurality of SIs, a backup active role for one or more of the plurality of Sis, and a backup standby role for one or more of the plurality of SIs, wherein the assigning is performed in a manner which enables a balanced distribution of SI load during runtime of the system both before and after a failure of one of the plurality of SUs;
    configuring said plurality of SUs for redundant operation based on said assigned roles; and
    wherein said assigning further comprises:
        calculating an active role load, a backup active role load and a backup standby role load for each of said plurality of SUs wherein said calculating is constrained such that a sum of said active role load, said backup active role load and said backup standby role load for any one of said plurality of SUs is less than or equal to the backup standby role load of a corresponding SU;
        calculating a standby role load range for each of said plurality of SUs; and calculating a backup assignment role load for each of said plurality of SUs wherein said backup assignment role load is a constraint such that a sum of said active role load, said backup active role load and said backup standby role load for all SUs for which said each of said plurality of SUs is assigned is less than or equal to said backup assignment role load.

2. The method of claim 1, wherein said configuring further comprises:
assigning one or more active roles, associated with one or more of said plurality of SIs, to at least some of said plurality of SUs;
assigning one or more backup active roles, associated with one or more of said plurality of SIs, to at least some of said plurality of SUs wherein each of the SUs associated with said one or more backup active roles cannot be duplicated; and
assigning one or more standby roles, associated with one or more of said plurality of SIs, to at least some of said plurality of SUs.

3. The method of claim 1, wherein said calculating an active role load, a backup active role load and a backup standby role load further comprises:
dividing a number of said plurality of SIs by a number of said plurality of SUs;
truncating a quotient of said dividing to a whole number for use as a first active role load; and
if the result of the dividing is a non-integer, adding one to said first active role load for use as a second active role load.

4. The method of claim 1, wherein said calculating a standby role load further comprises:
dividing a number of said plurality of SIs by a number of said plurality of SUs;
multiplying a quotient of said dividing by a predetermined number of standby role assignments;
truncating a product of said multiplying to a whole number for use as a first standby role load; and
if the result of the dividing is a non-integer, adding one to said first standby role load for use as a second standby role load.

5. The method of claim 1, wherein said calculating a backup assignment role load further comprises:
dividing a number of said plurality of SIs by a number of said plurality of SUs and truncating a quotient of said dividing to a whole number;
multiplying said whole number by a sum of a predetermined number of standby role assignments and one for use as a first backup assignment role load; and
if the result of the dividing is a non-integer, multiplying a sum of said whole number and one by a sum of said predetermined number of standby role assignments and one for use as a second backup assignment role load.

6. The method of claim 1, wherein said active role load range, said backup active role load range and said standby role load range are equal for any given SU.

7. The method of claim 1, wherein a role of each SU associated with an SI has a predetermined ranking.

8. The method of claim 7, wherein said predetermined ranking from highest rank to lowest rank is Active, Backup Active, Standby and Backup Standby.

9. A computer system for providing configuration for High Availability (HA) of a Service, said computer system comprising:
a processor configured to assign roles to a plurality of Service Units (SUs) associated with a plurality of Service Instances (SIs) in a system configured to use an Nway redundancy model, wherein the assigning is performed in a manner which enables a balanced distribution of SI load during runtime of the system both before and after a failure of one of the plurality of SUs, wherein said Nway redundancy model is defined such that an SU can simultaneously be assigned an active role for one or more of said plurality of SIs, a standby role for one or more of said plurality of SIs, a backup active role for one or more of the plurality of SIs, and a backup standby role for one or more of the plurality of SIs;
wherein the processor is further adapted to configure said plurality of SUs for redundant operation based on said assigned roles; and
wherein said processor is further configured to assign the roles by calculating an active role load, a backup active role load and a backup standby role load for each of said plurality of SUs wherein said calculating is constrained such that a sum of said active role load, said backup active role load and said backup standby role load for each of said plurality of SUs is less than or equal to a corresponding backup standby role load, by calculating a standby role load range for each of said plurality of SUs; and by calculating a backup assignment role load for each of said plurality of SUs wherein said backup assignment role load is a constraint such that a sum of said active role load, said backup active role load and said backup standby role load for all SUs for which said each of said plurality of SUs is assigned is less than or equal to said backup assignment role load.

10. The computer system of claim 9, wherein said processor is further adapted to configure the plurality of the SUs by assigning one or more active roles, associated with one or more of said plurality of SIs, to at least some of said plurality of SUs, by assigning one or more backup active roles, associated with one or more of said plurality of SIs, to at least some of said plurality of SUs wherein each the of SUs associated with said one or more backup active roles cannot be duplicated; and by assigning one or more standby roles, associated with one or more of said plurality of SIs, to at least some of said plurality of SUs.

11. The computer system of claim 9, wherein said processor performs the calculating for an active role load, a backup active role load and a backup standby role load by dividing a number of said plurality of SIs by a number of said plurality of SUs, by truncating a quotient of said dividing to a whole number for use as a first active role load, and, if the result of the dividing is a non-integer, by adding one to said first active role load for use as a second active role load.

12. The computer system of claim 9, wherein said processor performs said calculating of a standby role load by dividing a number of said plurality of SIs by a number of said plurality of SUs, by multiplying a quotient of said dividing by a predetermined number of standby role assignments, by truncating a product of said multiplying to a whole number for use as a first standby role load; and, if the result of the dividing is a non-integer, by adding one to said first standby role load for use as a second standby role load.

13. The computer system of claim 9, wherein said processor performs said calculating of a backup assignment role by dividing a number of said plurality of SIs by a number of said plurality of SUs and truncating a quotient of said dividing to a whole number; by multiplying said whole number by a sum of a predetermined number of standby role assignments and one for use as a first backup assignment role load; and, if the result of the dividing is a non-integer, by multiplying a sum of said whole number and one by a sum of said predetermined number of standby role assignments and one for use as a second backup assignment role load.

14. The computer system of claim 9, wherein said active role load range, said backup active role load range and said standby role load range are equal for any given SU.

15. The computer system of claim 11, wherein a role of each SU associated with an SI has a predetermined ranking.

16. The computer system of claim 15, wherein said predetermined ranking from highest rank to lowest rank is Active, Backup Active, Standby and Backup Standby.

* * * * *

UNITED STATES PATENT AND TRADEMARK OFFICE
CERTIFICATE OF CORRECTION

PATENT NO. : 8,719,835 B2
APPLICATION NO. : 13/472616
DATED : May 6, 2014
INVENTOR(S) : Kanso et al.

Page 1 of 1

It is certified that error appears in the above-identified patent and that said Letters Patent is hereby corrected as shown below:

In the Specification:

In Column 5, Line 48, delete "Redundancy" and insert -- Redundancy: --, therefor.

In the Claims:

In Column 12, Line 37, in Claim 10, delete "each the of" and insert -- each of the --, therefor.

Signed and Sealed this
Sixteenth Day of September, 2014

Michelle K. Lee
*Deputy Director of the United States Patent and Trademark Office*